(12) United States Patent
Fukuhara

(10) Patent No.: US 6,751,676 B2
(45) Date of Patent: Jun. 15, 2004

(54) NETWORK CONTROL SYSTEM, NETWORK APPARATUS, REPEATER, AND CONNECTING APPARATUS

(75) Inventor: Yoshiyuki Fukuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 10/210,081

(22) Filed: Aug. 2, 2002

(65) Prior Publication Data

US 2003/0028677 A1 Feb. 6, 2003

Related U.S. Application Data

(63) Continuation of application No. PCT/JP00/00632, filed on Feb. 4, 2000.

(51) Int. Cl.$^7$ .............................................. G06F 15/16
(52) U.S. Cl. ...................... 709/250; 709/223; 709/246; 713/340
(58) Field of Search ....................... 709/200, 223–224, 709/227–228, 245–246, 250; 710/105; 713/300, 310, 340; 714/14

(56) References Cited

U.S. PATENT DOCUMENTS

| | | | | |
|---|---|---|---|---|
| 5,524,254 A | * | 6/1996 | Morgan et al. ............. | 709/250 |
| 5,652,892 A | | 7/1997 | Ugajin ....................... | 713/310 |
| 5,937,201 A | * | 8/1999 | Matsushita et al. ......... | 709/223 |
| 6,345,309 B2 | * | 2/2002 | Ohsawa et al. ............. | 709/250 |
| 6,694,363 B1 | * | 2/2004 | Yamadaji et al. ........... | 709/223 |

FOREIGN PATENT DOCUMENTS

| | | | | |
|---|---|---|---|---|
| JP | 5-260066 | 10/1993 | ........... | H04L/12/44 |
| JP | 6-067762 | 3/1994 | ........... | H04L/12/24 |
| JP | 7-115428 | 5/1995 | ........... | H04L/12/40 |
| JP | 11-088352 | 3/1999 | ........... | H04L/12/28 |

* cited by examiner

Primary Examiner—Bharat Barot
(74) Attorney, Agent, or Firm—Staas & Halsey LLP

(57) ABSTRACT

A network control system includes a managing device, separate devices that communicate with the managing device, and a repeater that interconnects the managing device and separate devices. In the network control system, when the managing device performs maintenance, the separate devices each include a separate device side power source control circuit. The power source control circuit controls the on-state and off-state levels of a power source which is to be delivered to a circuit including at least an activating signal monitor unit such as a separate device side wake-up packet monitor unit that monitors whether or not an activating signal such as a wake-up packet sent from tho managing device via the repeater has been received. When the power source control circuit detects that the power source switch of the separate device is in off-state, the power source control circuit suppresses the transmission of a predetermined signal to the repeater. The repeater includes a repeater side power source control circuit that controls the on-state and off-state levels of a power source which is to be delivered to a transmission/reception circuit. When the repeater side power source control circuit detects that a separate device has stopped transmitting the predetermined signal, the repeater side power source control circuit sets the power source which is delivered to the transmission/reception circuit, to the off-state level.

18 Claims, 13 Drawing Sheets

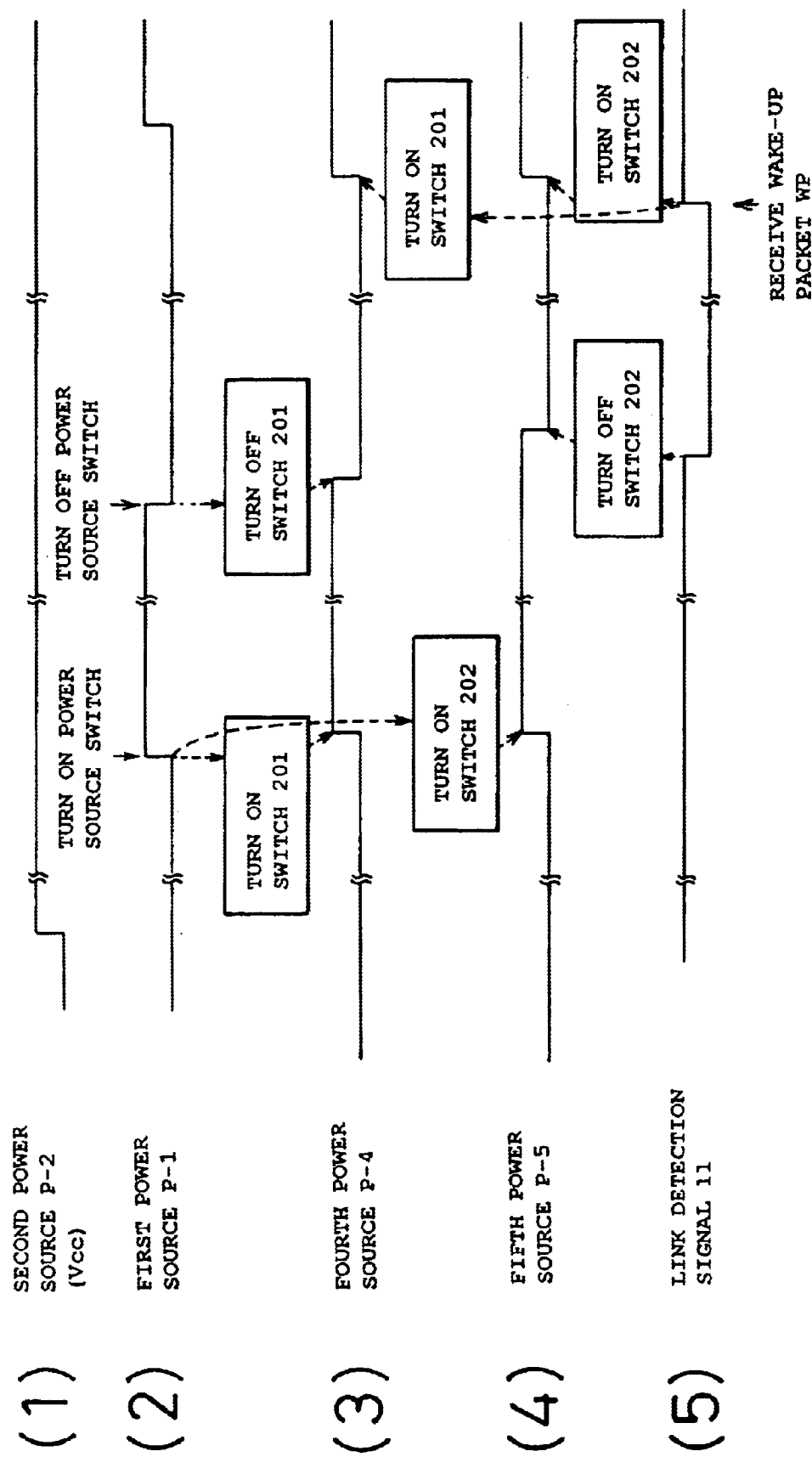

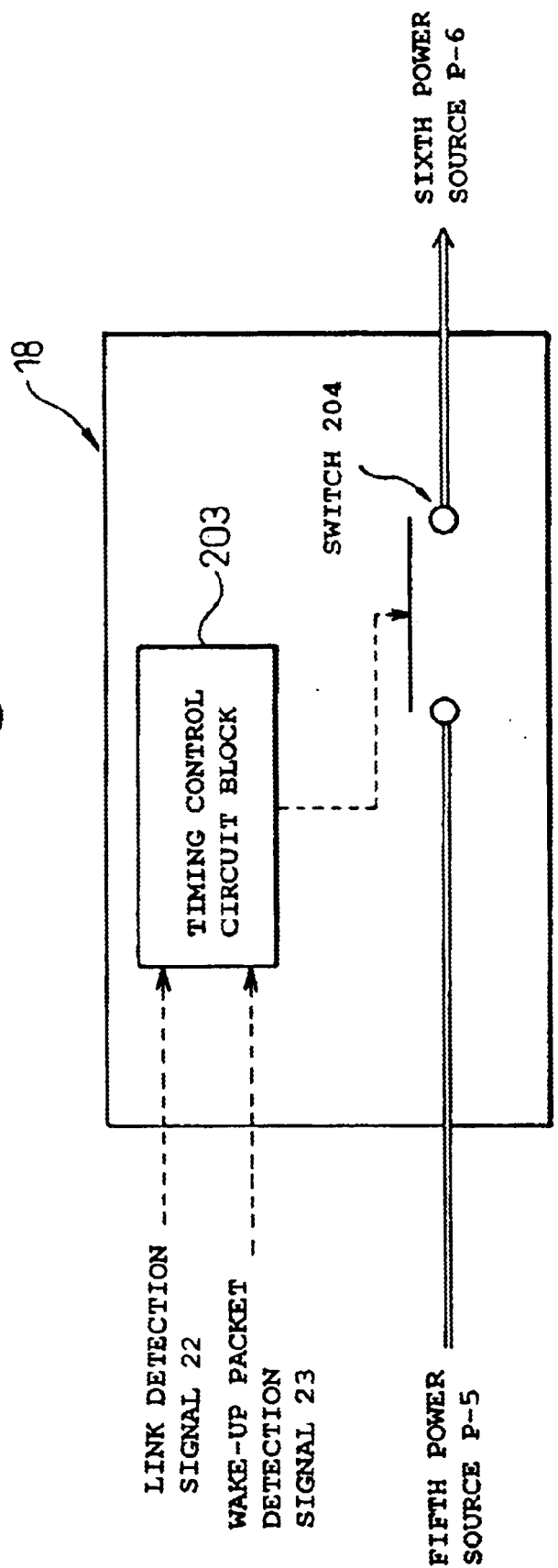

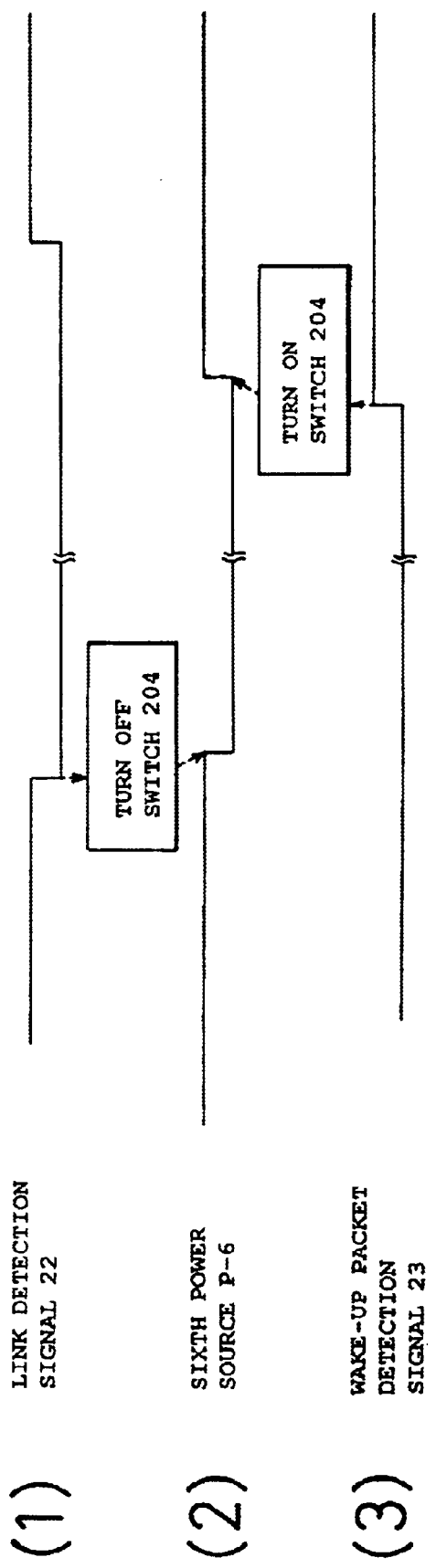

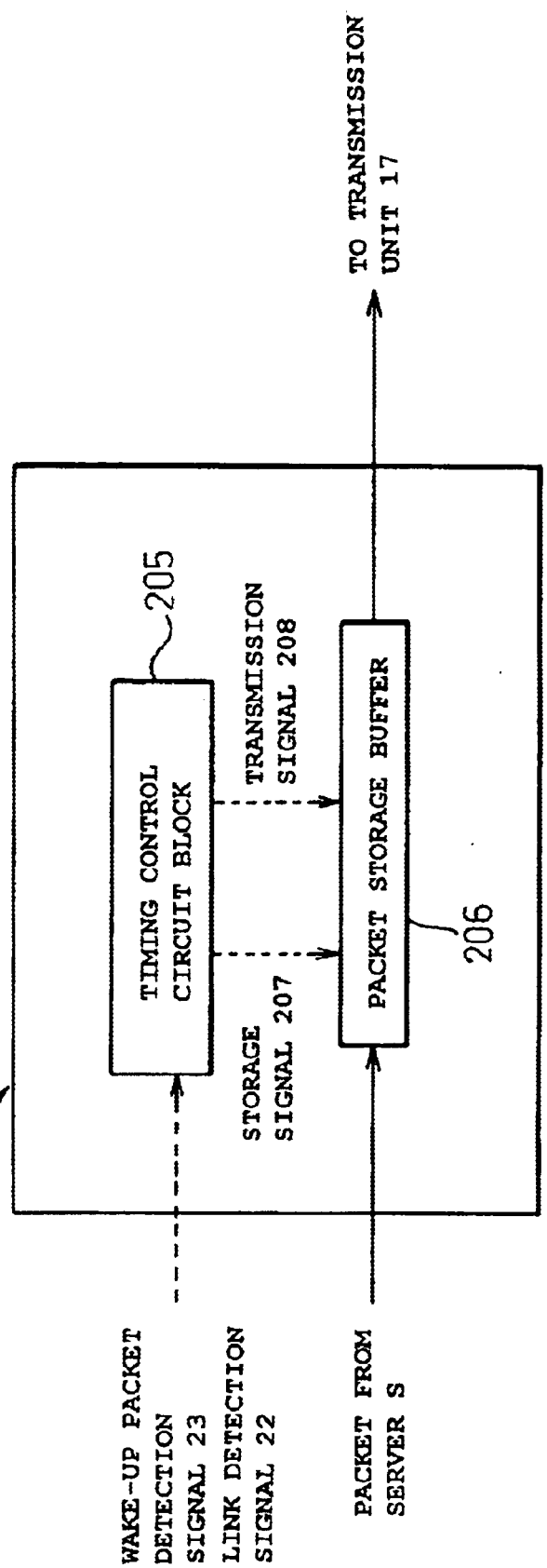

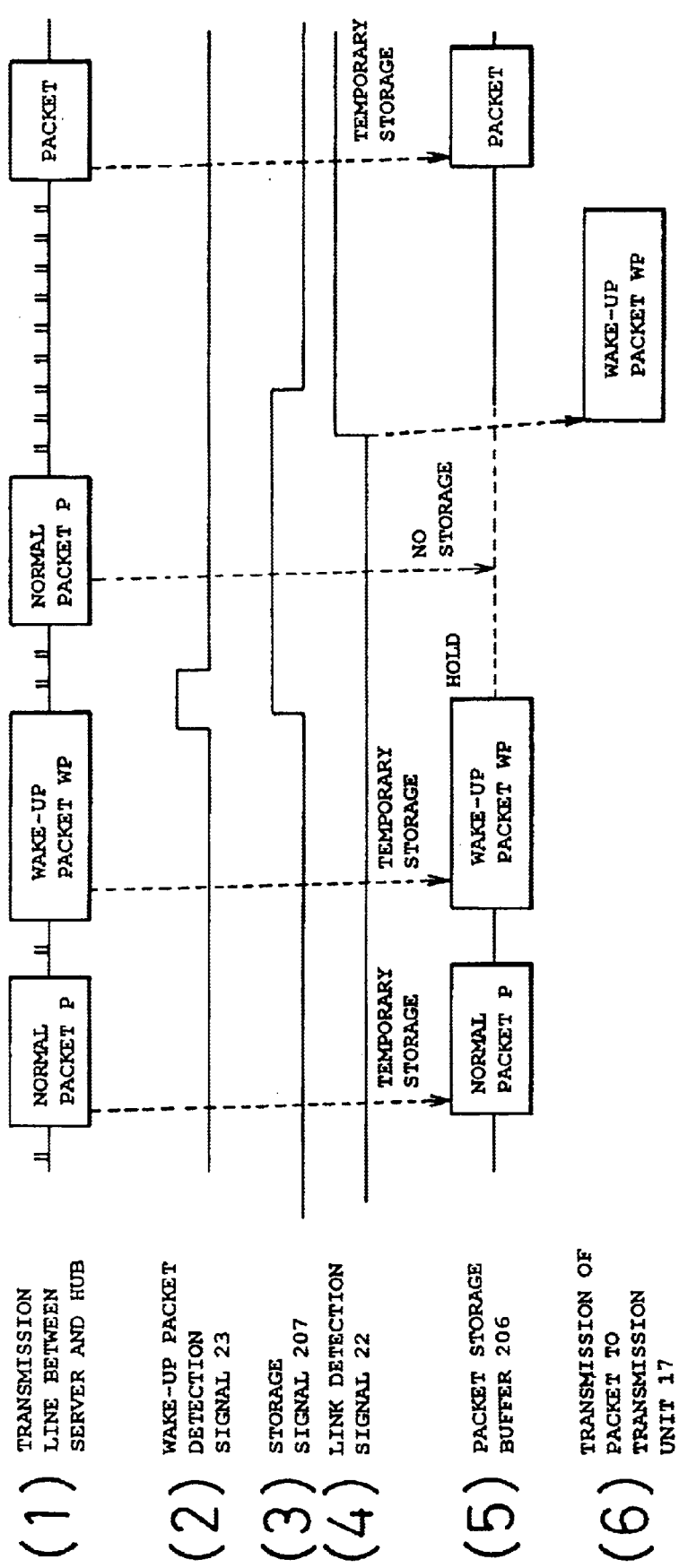

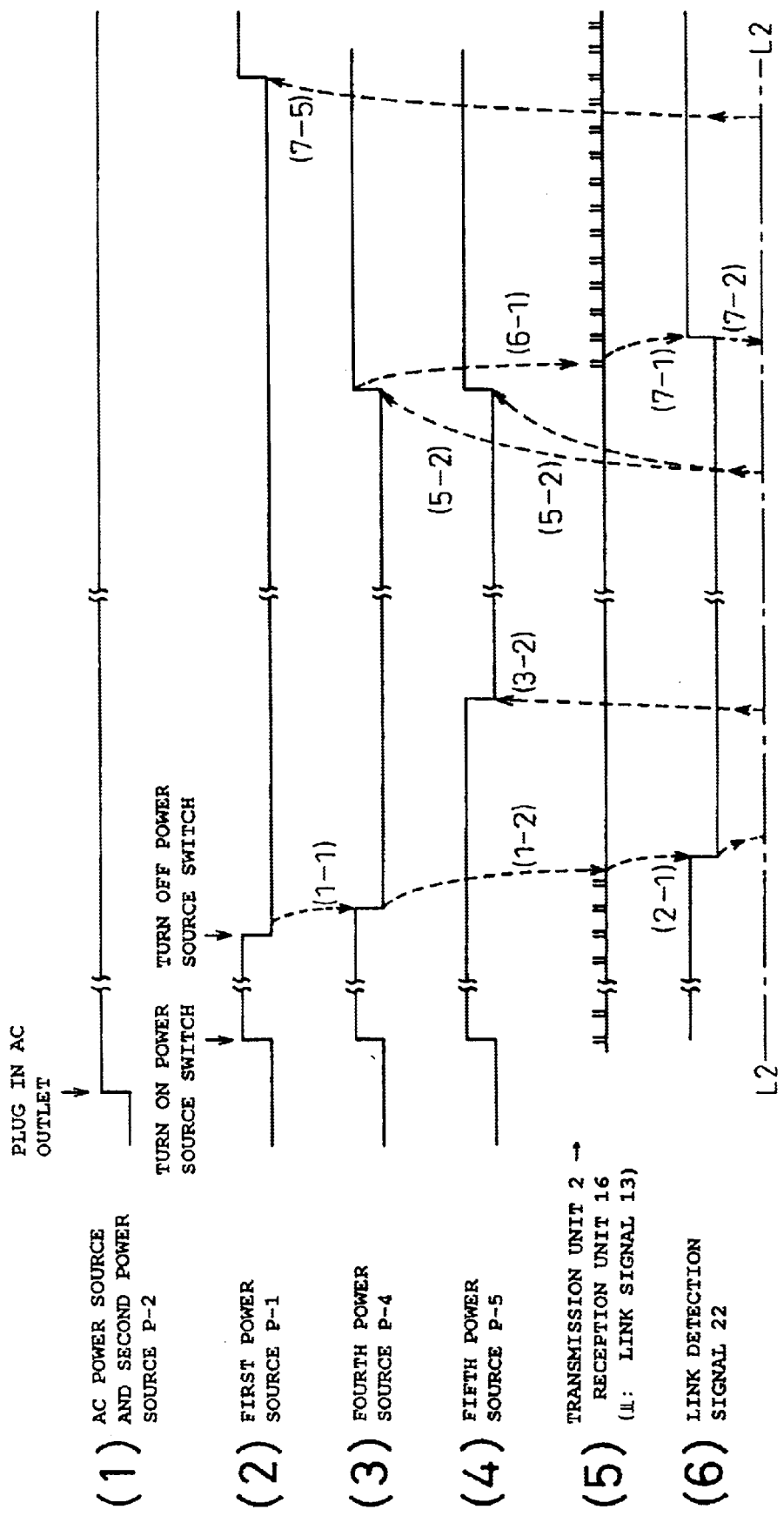

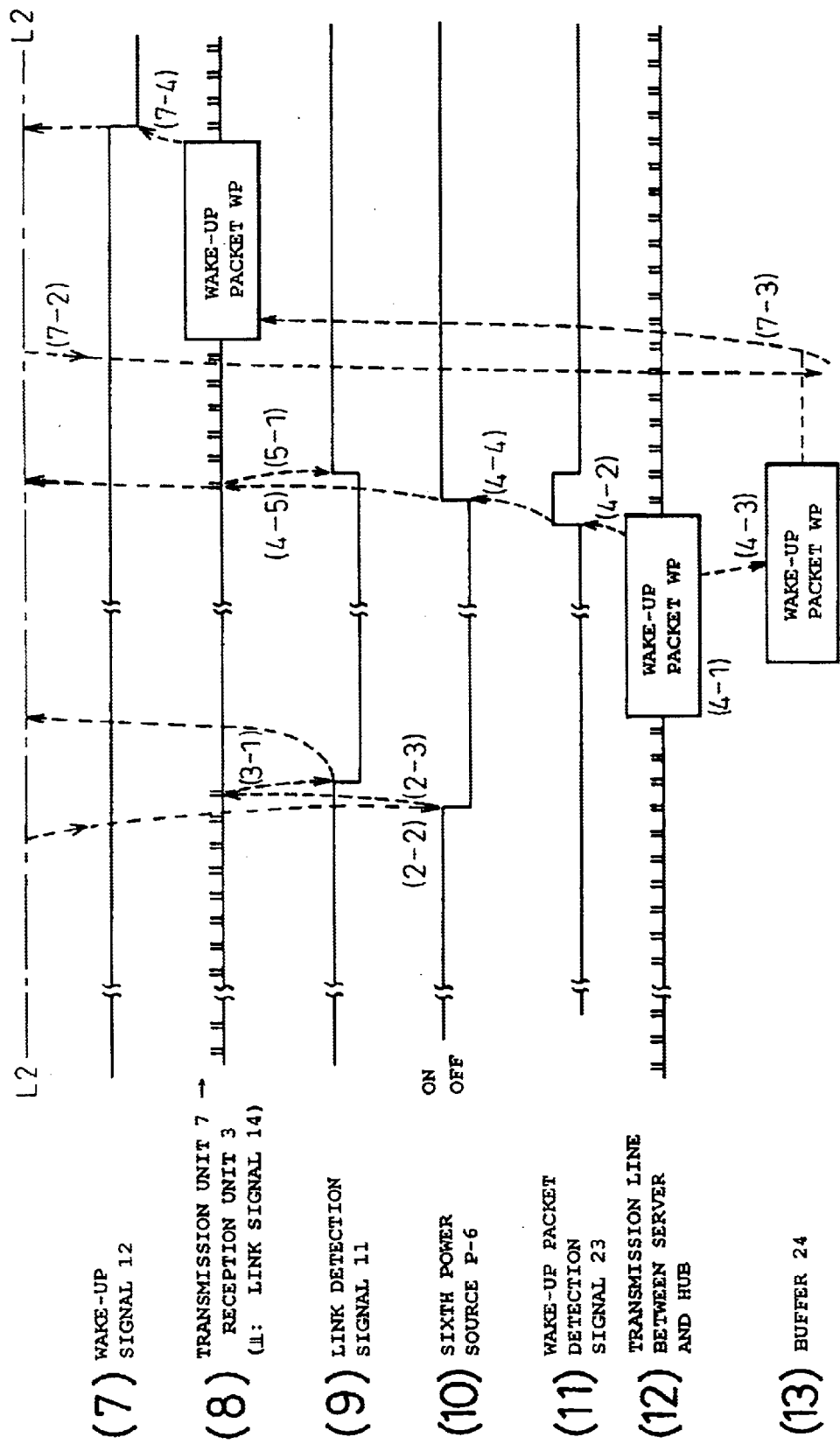

NETWORK CONTROL SYSTEM, NETWORK APPARATUS, REPEATER, AND CONNECTING APPARATUS

CROSS-REFERENCE TO RELATED APPLICATION

This application is a continuation application and is based upon PCT/JP00/00632 filed on Feb. 4, 2000.

BACKGROUND OF THE INVENTION

1. Field of the Invention

The present invention relates to a network control system mainly comprising a managing device (typically a server) that provides various kinds of services, separate devices (typically, clients) that request various kinds of services and a repeater (typically, a hub) that interconnects the managing device and separate devices. The present invention also relates to a network apparatus, a repeater; and a connecting apparatus.

More particularly, the present invention pertains to a technique implemented in a client-server local area network (usually abbreviated to "LAN") control system. The technique is intended to reduce electric power that is consumed by a client and a hub in the case in which, in the nighttime or when the power source of a client is turned off, a power source switch on the client is automatically turned on by means of a special packet, which in sent from a server and generally called "wake-up packet," in order to perform various kinds of maintenance on the client under remote control from the server.

2. Description of the Related Art

Herein, in an effort to clarify problems underlying the related arts, a configuration of a convectional LAN control system and the operations performed by the LAN control system will be explained with reference to FIG. 1 to FIG. 3 that will be described later in "Brief Description of the Drawings."

A block diagram schematically showing the configuration of a conventional client-server LAN control system is illustrated in FIG. 1.

Herein, what is referred to as a "server" is hardware or software having the function of providing various services to other machines (that is, separate devices each including hardware or software and each being called, typically, a client) in a network configuration. Referring to FIG. 1, a server is a device S having hardware and software integrated thereinto. From a functional viewpoint, tho server often manages programs, databases, printers, and a network. On the other hand, a server may be defined as a device that receives requests. By the way, what is referred to as a "client" is a device that requests tho server to render services. In the client-server LAN control system, the client is often realized as a personal computer operated by a user. Heroin, a term "client-server LAN (or a client-server model)" defines a processing form in which the roles to be filled by computers interconnected over a LAN are clarified, that is, one of basic models of distributed processing. The client-server LAN accommodates a server that provides specified features and clients that utilize the features. Normally, the clients are realized as users' personal computers, and the server is realized as a computer having a high processing ability. Services provided by the server are often arithmetic operations that require a database or that must be performed at high speed. On the other hand, the server manages the whole of a client-server LAN control system.

As is obvious from the block diagram of FIG. 1, in the typical client-server LAN control system, the server S (managing device) that manages the whole of the system exists on a basic LAN (BL). A hub H in connected to the basic LAN in the form of a chip. The clients C (separate devices) are realized as personal computers (usually, simply called computers) and are connected on the basic LAN via the hub H. The hub H serves as a repeater for connecting a plurality of clients to a LAN. The protocol which the clients C and hub H use is Ethernet 10 Base-T (transmission rate: 10 megabits per sec (Mbps)) or Ethernet 100 Base-TX (transmission rate: 100 Mbps).

An alternating current (ac) power source cable AD led out from each client C is plugged into a mains ac outlet AS formed on a wall or the like. Electric power is distributed to each client through the ac outlet AS. Normally, the ac power source cable AP remains plugged in the ac outlet AS. The on-state or off-state of a power source of a personal computer realizing each client is determined with a power source switch PS on each client C (device). The power source of the client C is in off-state unless it is being used.

The server performs various kinds of maintenance on a specified client, through remote control, when the client is not being used and the power source thereof is in off-slate (in the nighttime). At this time, the power source switch on the client must be turned on in order to perform maintenance on the client. Therefore, the server transmits a wake-up packet WP (corresponding to an activating signal that will be described later) to the specified client. The wake-up picket is structured based on a specific packet format, and defined as a packet that, when the client receives the packet, turns on the power source of the client. The wake-up packet is transmitted to the specified client via the hub. When the power source switch on the client is in off-state, if the client receiver the wake-up packet, the client turns on the power source switch thereon automatically. Thereafter, software is upgraded or various kinds of information are transferred between the server and client.

A block diagram showing the internal configurations of a conventional client and a conventional hub, is illustrated in FIG. 2. Further, a timing chart for explaining the conventional sequence of the delivery of power sources, is illustrated in FIG. 3. Shown in FIG. 2 are the practical configurations of a conventional client and a conventional hub included in a LAN control system.

As shown in FIG. 2, tho conventional client C mainly comprises a power source circuit 6 that generates electric power for the client, a circuit portion 4 including a CPU (central processing unit), a memory, and a chip set, and a LAN control circuit 1 including a LAN chip that controls a LAN. The power source circuit 6 receives ac power by way of an ac power source cable AP, internally converts the ac power to direct current (dc) power, supplies a first power source P-1 to the circuit portion 4 including the CPU, and supplies second power source P-2 to the LAN control circuit 1.

Referring to the timing chart of FIG. 3, a description will be made regarding the sequence of the delivery of power sources in the client or hub. Normally, the ac power source cable is left plugged into the ac outlet, and an ac power source is always set to an on-state level ((1) in FIG. 3). The delivery of the first power source P-1 and a second power source P-2 is controlled by the power source switch PS ((2) in FIG. 2). When the power source switch PS is in on-state, that is, when the client is used, the first power source P-1 is delivered. When the power source switch PS is in off-state, that is, the client is unused, the first power source P-1 is not delivered ((3) in FIG. 3). On the other hand, the power source circuit 6 must keep delivering the second power source P-2 to the LAN control circuit 1 so that the LAN control circuit can receive the wake-up packet from the server 5 even when the client is unused. When ac power is having supplied, the second power source P-2 is Ret to the on-state level irrespective of whether the power source switch PS is turned on or turned off ((4) in FIG. 3). Furthermore, the third power source P-3 delivered from a power source circuit 19 incorporated in the hub H is get to the on-state level, irrespective of whether the power source switch PS in turned on or turned off ((5) in FIG. 3). This is intended to allow the hub h to receive the wake-up packet from the server S.

The power source circuit 6 delivers the first power source P-1 to the circuit portion 4 including the CPU, memory, and chip set. When user uses the client personal computer (when the power source switch PS is turned on), the circuit portion 4 is activated and put into operation. In this case, the circuit portion 4 is connected to the LAN control circuit 1 over a personal computer interface (PCT) bus 5. When a user uses the client personal computer, the user may insert a storage medium 40, such as a hard disk or a magneto-optical disk, into a slot in the personal computer so as to start up the personal computer. The second power source P-2 is delivered from the power source circuit 6 to the LAN control circuit 1, which is realized with a LAN chip, through a Vcc pin. When the ac power is supplied to the client, the second power source P-2 is set to the on-state level, irrespective of the state of the power source switch PS.

Furthermore, the LAN control circuit 1 includes a wake-up packet monitor unit 10 (corresponding to an activating signal monitor unit included in a separate device that will be described later). The wake-up packet monitor unit 10 monitors a packet received by a reception unit 3 included in the LAN control circuit so as to check if the packet is a wake up packet. As the wake-up packet, a magic packet structured based on a special format is adopted. If the received packet is the wake-up packet, the fact is reported to the outside using a wake-up signal 12. The wake-up signal 12 is combined with a PME# signal on the PCI bus, undergoes a logical sum (i.e., logical OR) with A power on/off signal sent from the power source switch PS, and then applied to the power source circuit 6. The active state of the power source circuit 6 is initiated with a press of the power source switch PS or the application of the PME# signal. The inactive state of the power source circuit 6 is initiated by turning off the power source switch PS, but is not initiated with the PME# signal ((6) in FIG. 3).

The client and hub H shown in FIG. 2 are physically interconnected by way of a 10 Base-T or 100 Base-TX twisted-pair cable TC. Over tho twisted-pair cable, a TX+/– signal produced by a transmission unit 2 incorporated in the LAN control circuit and an RX+/– signal produced by a reception unit 16 incorporated in a transmission/reception circuit 26 in the hub, are combined with each other. Moreover, a TX+/– signal produced by a transmission unit 17 incorporated in the transmission/reception circuit 26 in the hub and an RX+/– signal produced by a reception unit 3 incorporated in the client, are combined with catch other ((7) and (8) in FIG. 3).

The logical connection between the LAN control circuit 1 and hub H is attained with establishment of a link. Over a transmission line, a link signal 13 is superposed on the TX+/– signal produced by the client, and the hub identities the link signal 13. Over a reception line, when the hub receives a wake-up packet, a link signal 14 is superposed on the TX+/– signal produced by the hub, and the client identifies the link signal 14. When both the link signals 13 and 14 are identified, a link is established. The link signals 13 and 14 are produced respectively with the LAN control circuit 1 in the client activated and with the power source of the hub turned on. Normally, the link is left established.

The link signal is a pulsating signal transmitted over a LAN at intervals of a certain time or cycle. The 10 Base-T or 100 Base-TX protocol is adopted as a standard rule.

The wake-up packet is transmitted from the server to the client via the hub in the state that a link is established between the LAN control circuit 1 and hub. The LAN control circuit 1 must therefore be able to receive the wake-up packet from the server all the time. The second power source P-2 is therefore delivered to the LAN control circuit 1 in order to keep the link established all the time.

As mentioned above, in the conventional LAN control system, maintenance of each client by a server is performed in the nighttime when a user is absent. In this case, the server performs maintenance on clients in order. The clients must therefore be able to receive a wake-up packet from the server all the time. The LAN control circuit incorporated in each client must always be active and the power source of a hub must always be in the on-state. However, in reality, only when maintenance is performed, must the LAN control circuit be active and the power source be in on-state. This poses a problem in which electric power is unnecessarily wasted.

In Japanese Unexamined Patent Application Publication (Kokai) No. 7-115428 (published on May 2, 1995) that is the first related art concerning the conventional LAN control system, a remote power source control method has been disclosed. According to the remote power source control method, a remote power source control unit 200 that operates with an auxiliary power source 310 (equivalent to the second power source in FIG. 2) is included in a plurality of information processing devices that is interconnected over a network. Based on data received by the remote power source control unit 200, the delivery of main power source 300 in each information processing device (equivalent to the first power source in FIG. 2) is controlled to be continued or discontinued.

In the foregoing remote power source control method, a remote power source control can be achieved independently of a network architecture, and a security check can be performed reliably. However, according to the above method, the auxiliary power source 310 must always be set to an on-state level in order to allow the information processing device to stand by for a wake-up packet. Therefore, the aforesaid problem in which electric power is unnecessarily wasted in order to allow a device to stand by for a wake-up packet remains unsolved.

In Japanese Unexamined Patent Application Publication (Kokai) No. 6-67762 (published on Mar. 11, 1994) that is the second related art concerning the conventional LAN control system, the configuration of an automatic power source control device for an information processing terminal has been disclosed. The automatic power source control device operates with the delivery of a main power source 6 within a certain workstation. The automatic power source control device includes a main CPU 1 and a first sub CPU 2 that execute predetermined terminal processing jobs, and a second sub CPU 3 that receives another dedicated power source 7. In a stand-by mode in which the delivery of the main power source is discontinued, when the second sub CPU 3 receives and interprets a command for turning on a power source from another workstation, a power source control unit 4 delivers the main power source 6. Thereafter, the second sub CPU 3 passes LAN control to the first sub CPU 2.

In the foregoing configuration, a plurality of CPUs is used to control, that is, continue or discontinue the delivery of the main power source in the stand-by mode, in order to reduce electric power that is to be consumed in the standby mode. However, even in this configuration, the power source that is to be delivered to the CPU must be set to the on-state level all the time so that the information processing terminal can stand by for a wake-up packet. The aforesaid problem in which electric power is unnecessarily wasted in order to allow a device to stand by for a wake-up packet remains unsolved.

In short, in order to receive a wake-up packet, only when the wake-up packet is transmitted from a server, the power sources of a client and a hub may be turned on. In the related arts including the aforesaid related arts, however, electric power must be delivered to a LAN control circuit incorporated in the client and to the hub all the time.

SUMMARY OF THE INVENTION

Accordingly, the present invention attempts to solve the foregoing problems. An object of the present invention is to provide a network control system, a network apparatus, a repeater, and a connecting apparatus. In the network control system, electric power is delivered to a LAN control circuit incorporated in each client and to a hub only when electric power is needed in order to receive a wake-up packet from a server. Thus, the consumption of unnecessary electric power is suppressed.

In order to solve the aforesaid problems, according to the present invention, there is provided a network control system including a managing device, separate devices that communicate with the managing device and a repenter for interconnecting the managing device to the separate devices. The power source switch on a separate device that has received an activating signal sent from the managing device via the repeater is turned on, and the managing device performs various kinds of maintenance on the separate device. In such a network control system, each separate device includes a power source control circuit that controls the on-state and off-state levels of a power source which is to be delivered to a circuit including at least a separate device side activating signal monitor unit which monitors whether or not the activating signal has been received. Owing to the power source control circuit, when it is detected that the power source switch is in off-state, the transmission of a predetermined signal to the repeater is suppressed.

Preferable, when the repeater detects that a separate device has stopped transmitting the predetermined signal, the repeater stops transmitting a signal which indicates the reception of the predetermined signal, to the separate devise.

More preferably, when a separate device detects that the repeater has stopped transmitting the signal which indicates the reception of the predetermined signal, the separate device sets a power source which is to be delivered to the separate device side activating signal monitor unit, to an off-state level.

According to the present invention, there is provided a network apparatus having a power source switch thereof turned on when receiving an activating signal sent from a managing device via a repeater over a network. Various kinds at maintenance is performed on the device by the managing device. The device includes a power source control circuit that controls the on-state and off-state levels of a power source which is to be delivered to a circuit including at least an activating signal monitor unit which monitors whether or not the activating signal has been received. Owing to the power source control circuit, when it is detected that the power source switch is in off-state, the transmission of a predetermined signal to the repeater is suppressed.

Preferably, when the predetermined signal is not transmitted to the repeater any longer, if it is detected that the repeater has stopped transmitting a signal which indicates the reception of the predetermined signal, the power source control circuit sets a power source which is to be delivered to the activating signal monitor unit, to the off-state level.

More preferably, when the repeater notifies that it has detected the reception of the activating signal from the managing device, the power source control circuit sets a power source which is to be delivered to the circuit, including at least the activating signal monitor unit, to the on state level.

More preferably, in the network apparatus in accordance with the present invention, after the power source that is to be delivered to the circuit, including at least the activating signal monitor unit, is set to the on-state level, the predetermined signal is retransmitted to the repeater.

According to the present invention, there is provided a repeater which interconnects a managing device with separate devices, which communicate with the managing device, over a network. On receipt of an activating signal sent from the managing device, the repeater allows the managing device to perform various kinds of maintenance on each of the separate devices. The repeater includes an activating signal monitor unit and a power source control circuit. The activating signal monitor unit monitors whether or not the activating signal has been received. Based on a signal sent from the activating signal monitor unit, the power source control circuit controls the on-state and off-state levels of a power source which is to be delivered to a transmission/reception circuit that transfers various signals to or from each of the separate devices. When the transmission/reception circuit detects that a given separate device has stopped transmitting a predetermined signal, the power source control circuit sets the power source which is to be delivered to the transmission/reception circuit, to the off-state level. The transmission/reception circuit stops transmitting a signal which indicates reception of the predetermined signal, to the given separate device.

Preferably, when the activating signal monitor unit detects the reception of the activating signal, the power source control circuit sets the power source which is to be delivered to the transmission/reception circuit, to the on-state level. The transmission/reception circuit transmits the signal which indicates reception of the activating signal, to the given separate device.

More preferably, after the transmission/reception circuit transmits the signal which indicated reception of the activating signal, to the given separate device, when the transmission/reception circuit detects that the given separate device has retransmitted the predetermined signal, the transmission/reception circuit retransmits the signal which indicates the reception of the predetermined signal, to the given separate device.

According to the present invention, there is provided a connecting apparatus for connecting a network apparatus, which has a power source switch thereof turned on when receiving an activating signal sent from a managing device via a repeater over a network and on which the managing device performs various kinds of maintenance, onto the network. The connecting apparatus includes a power source control circuit that controls the on-state and off-state levels of the power source which is to be delivered to a circuit including at least an activating signal monitor unit which monitors whether or not the activating signal has been received. Owing to the power source control circuit, when it is detected that the power source is in off-state, the transmission of a predetermined signal to the repeater is suppressed.

Preferably, when the predetermined signal is not transmitted to the repeater any longer, if it is detected that the repeater has stopped transmitting a signal which indicates the reception of the predetermined signal, the power source control circuit sets the power source which is to be delivered to the activating signal monitor unit, to the off-state level.

More preferably, when the repeater notifies that it has detected the reception of the activating signal sent from the managing device, the power source control circuit sets the power source which is to be delivered to the circuit including at least the activating signal monitor units to the on-state level.

More preferably, in the network connecting block in accordance with the present invention, after the power source which is to be delivered to the circuit including at least the activating signal monitor unit is set to the on-state level, the predetermined signal is retransmitted to the repeater.

More particularly, in an LAN control system that is an example of a network control system in accordance with the present invention, the power source switch of a client having received a wake-up packet from a server via a hub is turned on automatically, and the server performs various kinds of maintenance on the client. In this case, the client includes a client side power source control circuit that controls the on-state and off-state levels of a power source which is to be delivered to a circuit including at least a client side wake-up packet monitor unit which monitors whether or not the wake-up packet has been received. When detecting that the power source switch is in off-state, the client side power source control circuit suppresses the transmission of a predetermined signal to the hub.

Preferably, when the hub included in the LAN control system in accordance with the present invention detects that the client has stopped transmitting the predetermined signal, the hub transmits a signal which indicates the reception of the predetermined signal, to the client.

More preferably, when a client included in the LAN control system in accordance with the present invention detects that the hub has stopped transmitting the signal indicating the reception of the predetermined, the client sets the power source which is to be delivered to the client side wake-up packet monitor unit, to the off-state level.

A LAN client in accordance with the present invention includes a client side power source control circuit which controls the on-state and off-state levels of the power source which is to be delivered to a circuit including at least a client side wake-up packet monitor unit which monitors whether or not a wake-up packet has been received. Owing to the power source control circuit, when it is detected that a power source switch is in off-state, the transmission of a predetermined signal to a hub is suppressed.

Preferably, in the client in accordance with the present invention, when the predetermined signal is not transmitted to the hub any longer, if it is detected that the hub has stopped transmitting the signal which indicates the reception of the predetermined signal, the client side power source control circuit sets the power source which is to be delivered to the client side wake-up packet monitor unit, to the off-state level.

More preferably, in the client in accordance with the present invention, when the hub notifies that the hub has detected the reception of the wake-up packet frown the server, the client side power source control circuit sets the power source which is to be delivered to the circuit, including at least the client side wake-up packet monitor unit, to the on-state level.

More preferably, in the client in accordance with the present invention, after the power source which is to be delivered to the circuit, including at least the client side wake-up packet monitor unit, is set to the on-state level, the predetermined signal is retransmitted to the hub.

A LAN hub in accordance with the present invention includes a hub side wake-up packet monitor unit and a hub side power source control circuit. The hub side wake-up packet monitor unit monitors whether or not a wake-up packet has been received. Based on a signal sent from the wake-up packet monitor unit, the hub side power source control circuit controls the on-state and off-state levels of the power source which is to be delivered to a transmission/reception circuit which transfers various signals to or from a client. When the transmission/reception circuit detects that the client has stopped transmitting a predetermined signal, the power source control circuit rats the power source which is to be delivered to the transmission/reception circuit, to the off-state level. The transmission/reception circuit stops transmitting a signal which indicates the reception of the predetermined signal, to the client.

Preferably in the hub in accordance with the present invention, when the hub side wake-up packet monitor unit detects the reception of the wake-up packet, the hub side power source control circuit sets the power source which is to be delivered to the transmission/reception circuit, to the on-state level. The transmission/reception circuit transmits a signal which notifies that the wake-up packet has been received, to the client.

More preferably, in the hub in accordance with the present invention, after the transmission/reception circuit transmits the signal which notifies that the wake-up packet has been received, to the client, when the client retransmits the predetermined signal, the transmission/reception circuit retransmits the signal which indicates the reception of the predetermined signal, to the client.

There is provided a storage medium that is computer-readable and is used to start up a personal computer realizing a client in accordance with the present invention. Means stored in the storage medium include a means for turning on the power source switch of a client on receipt of a wake-up packet sent from a server via a hub over a LAN; a means for controlling the on-state and off-state levels of a power source which is to be delivered to a circuit including at least a client side wake-up packet monitor unit which monitors whether or not the wake up packet has been received; and a means for, when it is detected that the power source switch is in off-state, suppressing the transmission of a predetermined signal to the hub.

In short, according to the present invention, when the power source switch of a client is in off-state, a power source control circuit included in the client (a separate device), and a wake-up packet monitor unit (activating signal monitor unit) and a power source control circuit included in a hub (repeater) are used to deactivate a LAN control circuit (connecting apparatus) realized with a LAN chip and turn off the power source of the hub unless the LAN control circuit and hub are needed. Thus, electric power which is to be consumed by the client and hub is saved. When a server (managing device) transmits a wake-up packet (activating signal), the LAN control circuit included in thy client is activated and the power source of the hub is turned on so that the LAN control circuit and hub can receive a wake-up packet.

As mentioned above, according to the present invention, electric power can be supplied to the LAN control circuit included in the client and to the hub only when the electric power is needed in order to receive a wake-up packet from the server. The consumption of unnecessary electric power can be suppressed.

BRIEF DESCRIPTION OF THE DRAWINGS

The present intention will be described with reference to the accompanying drawings:

FIG. 7 is a timing chart for explaining operation which are to be performed by a timing control circuit block shown in FIG. 6;

FIG. 8 is a block diagram showing the exemplary configuration of a power source control circuit shown in FIG. 5;

FIG. 9 is a timing chart for explaining operations which are to be performed by a timing control circuit block shown in FIG. 8;

FIG. 10 is a block diagram slowing the exemplary configuration of a buffer shown in FIG. 5;

FIG. 11 is a timing chart few explaining operations which are to be performed by the buffer shown in FIG. 10;

FIG. 12 is a timing chart (part 1) for explaining an overall processing sequence that involves a client and a hub in accordance with the embodiment of the present invention; and FIG. 13 is a timing chart (part 2) for explaining the overall processing sequence that involves the client and hub in accordance with the embodiment of the present invention.

DESCRIPTION OF THE PREFERRED EMBODIMENTS

Referring to the accompanying drawings (FIG. 4 to FIG. 13), the configuration of a preferred embodiment of the present invention and the operations thereof will be described below. Herein, a description will be made regarding the exemplary configurations of a client and a hub that constitute a major portion of a LAN control system in accordance with the present invention, and the operations which are to be performed by the client and hub.

Figure 4:
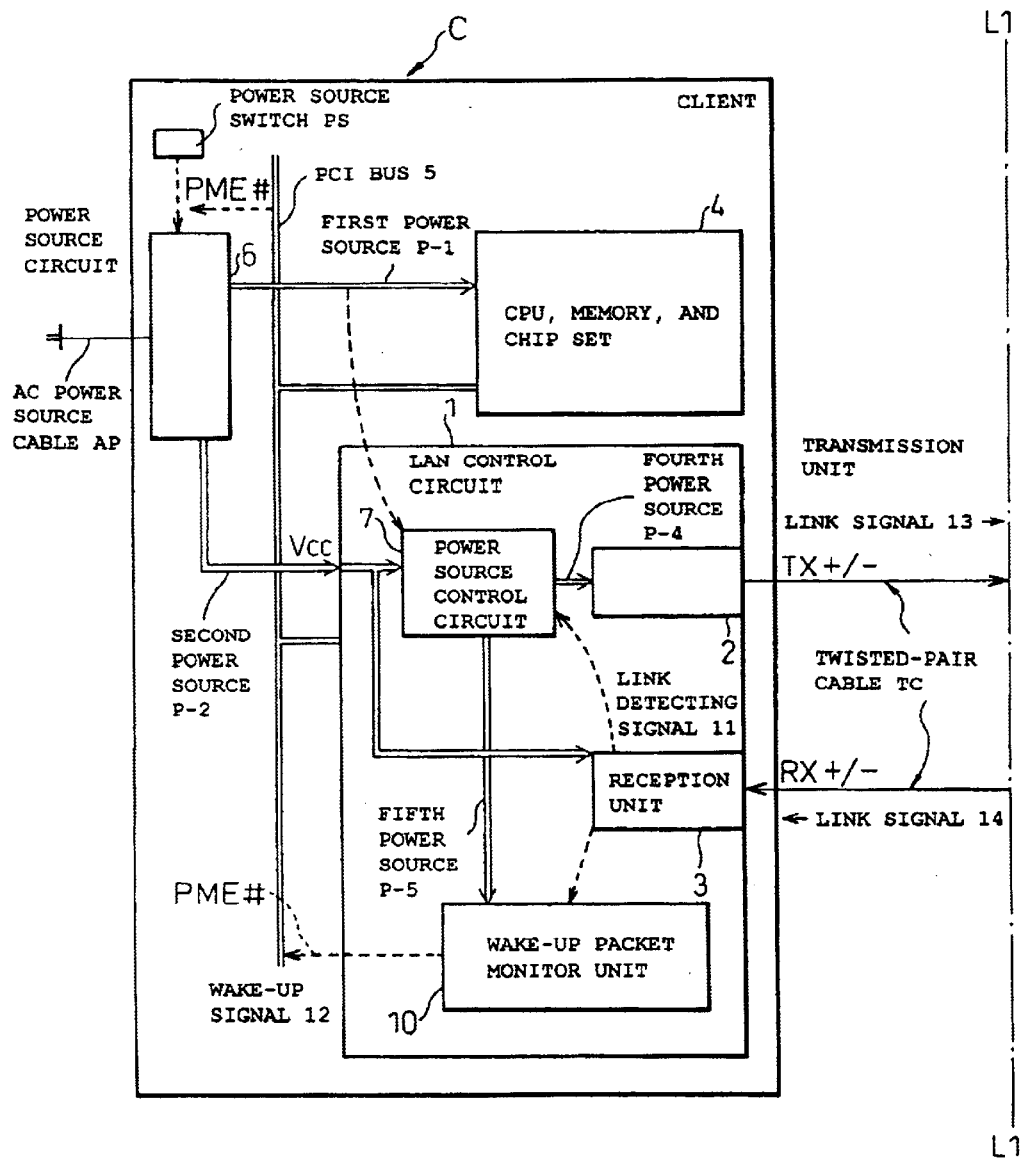
FIG. 4 is a block diagram showing the internal configuration of a client in accordance with an embodiment of the present invention.
Figure 5:
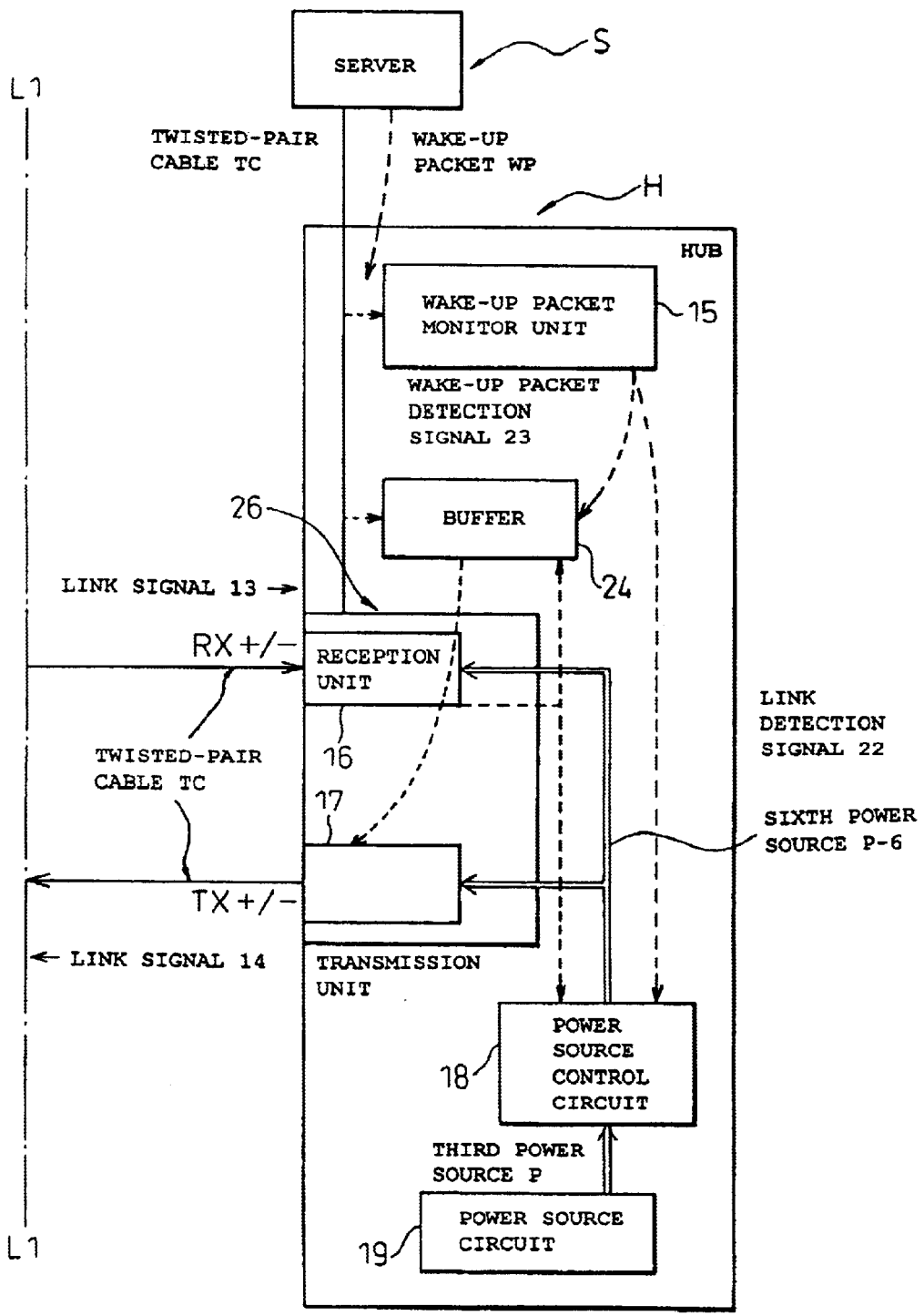
FIG. 5 is a block diagram showing the internal configuration of a hub in accordance with the embodiment of the present invention.

In an embodiment shown in FIG. 4 to FIG. 13, the aforesaid managing device, separate device, and repeater in accordance with the present invention are realized as, as one examples, a server S, a client C, and a hub H (see, for example, FIG. 4 and FIG. 5). Furthermore, the aforesaid activating signal monitor unit in accordance with the present invention included in the separate device is realized as, as one example, a wake-up packet monitor unit 10 (see, for example, FIG. 4) that is included in the client C in order to monitor a wake-up packet WP sent from the server S. Furthermore, the aforesaid repeater side activating signal monitor unit in accordance with the present invention is realized as, as one example, a wake-up packet monitor unit. 15 (see, for example, FIG. 5) that is included in the hub H in order to monitor the wake-up packet we sent from the server S.

Furthermore, the network apparatus on which the managing device performs various kinds of maintenance is realized as, as one example, the client C (see, for example, FIG. 4). Furthermore, the connecting apparatus for connecting the network apparatus onto a network is realized as, as one example, a LAN control circuit 1 (see, for example, FIG. 4) included in the client C.

FIG. 4 is a block diagram showing the internal configuration of a client in accordance with the embodiment of the present invention. FIG. 5 is a block diagram showing the internal configuration of the hub in accordance with the embodiment of the present invention. Hereinafter, the same reference numerals will be assigned to components identical to the aforesaid ones.

Figure 1:
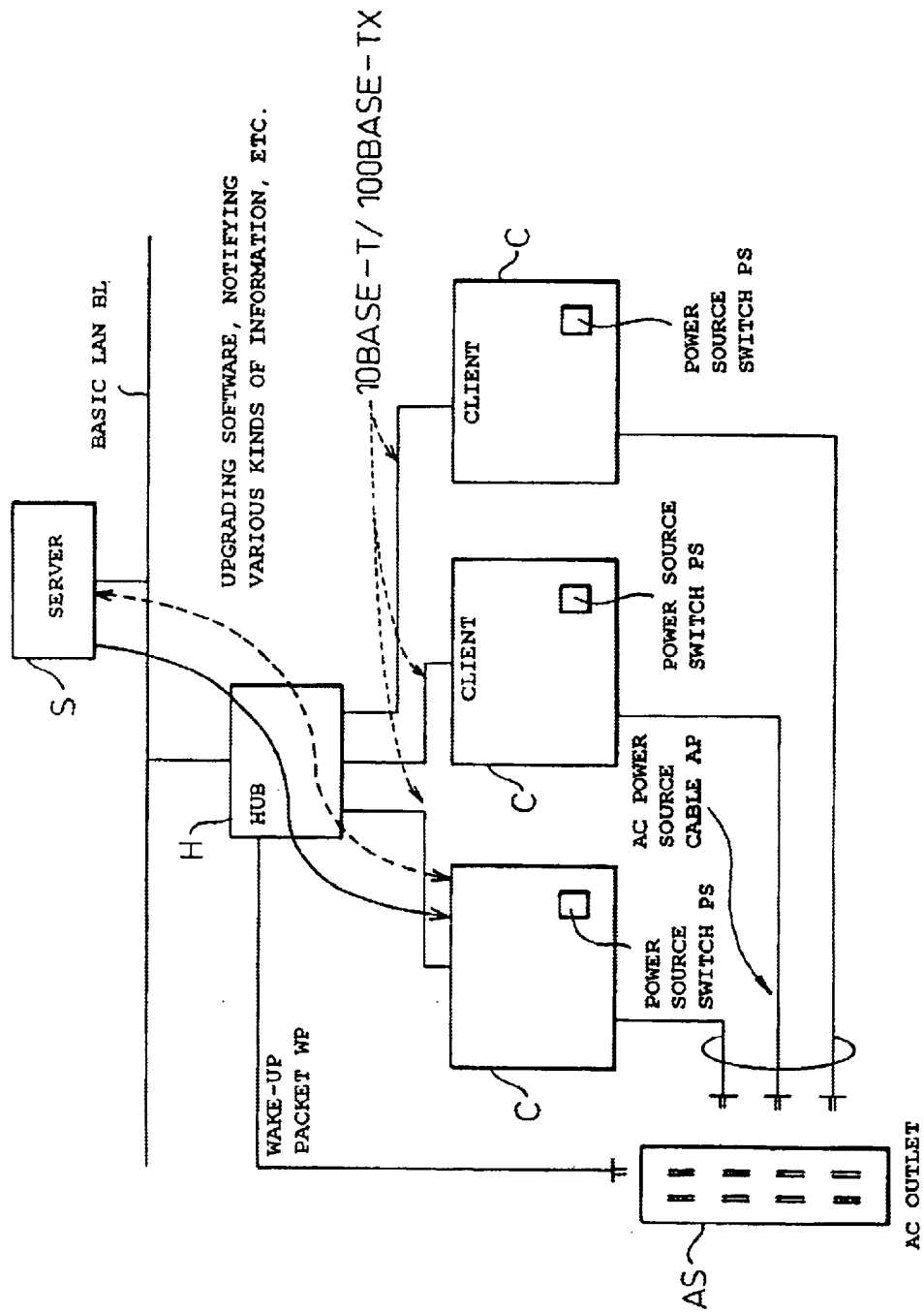
FIG. 1 is a block diagram schematically showing the configuration of a conventional client-server LAN control system.
Figure 2:
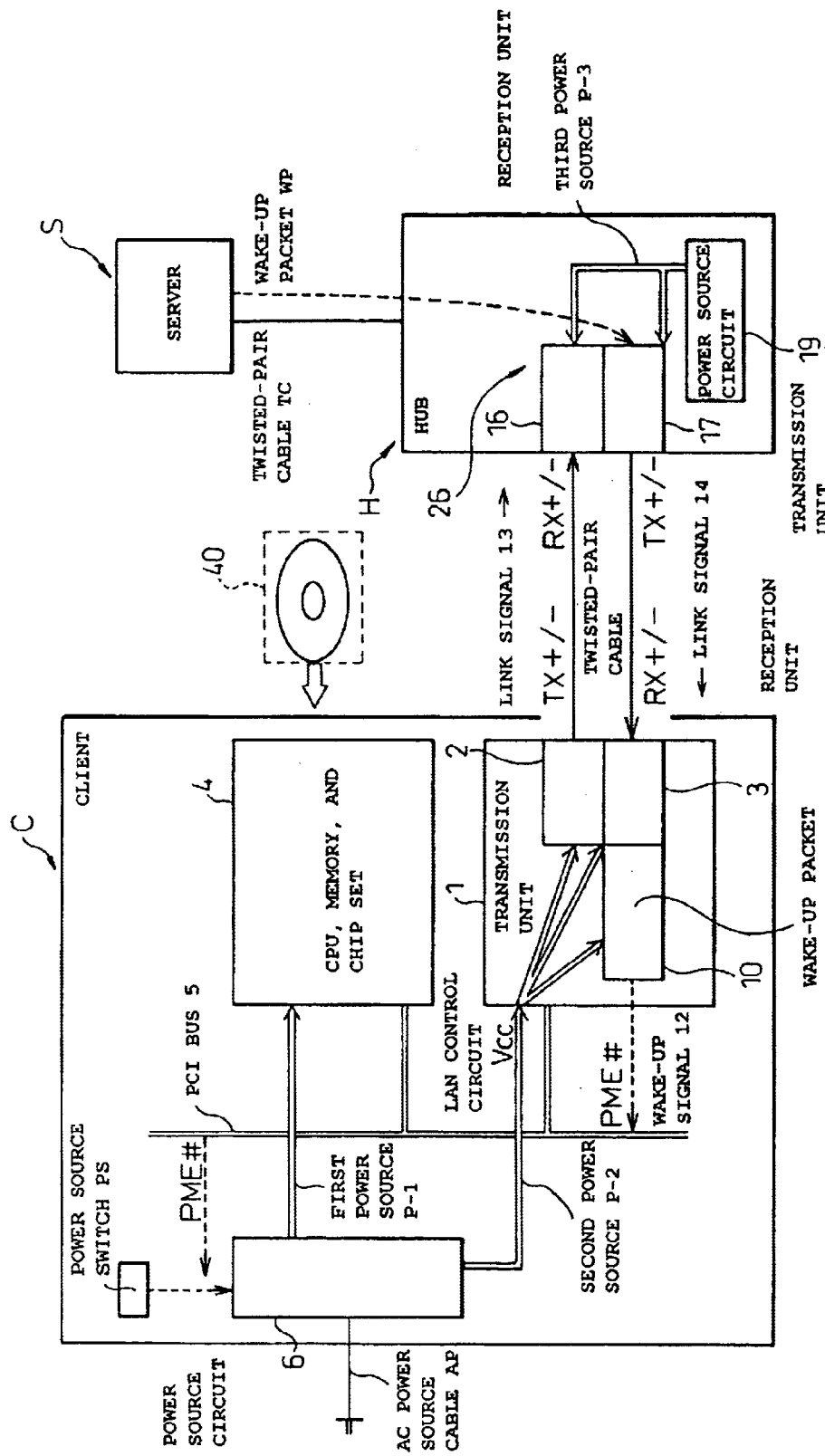
FIG. 2 is a block diagram showing the internal configuration of a conventional client and the internal configuration of a conventional hub.
Figure 3:
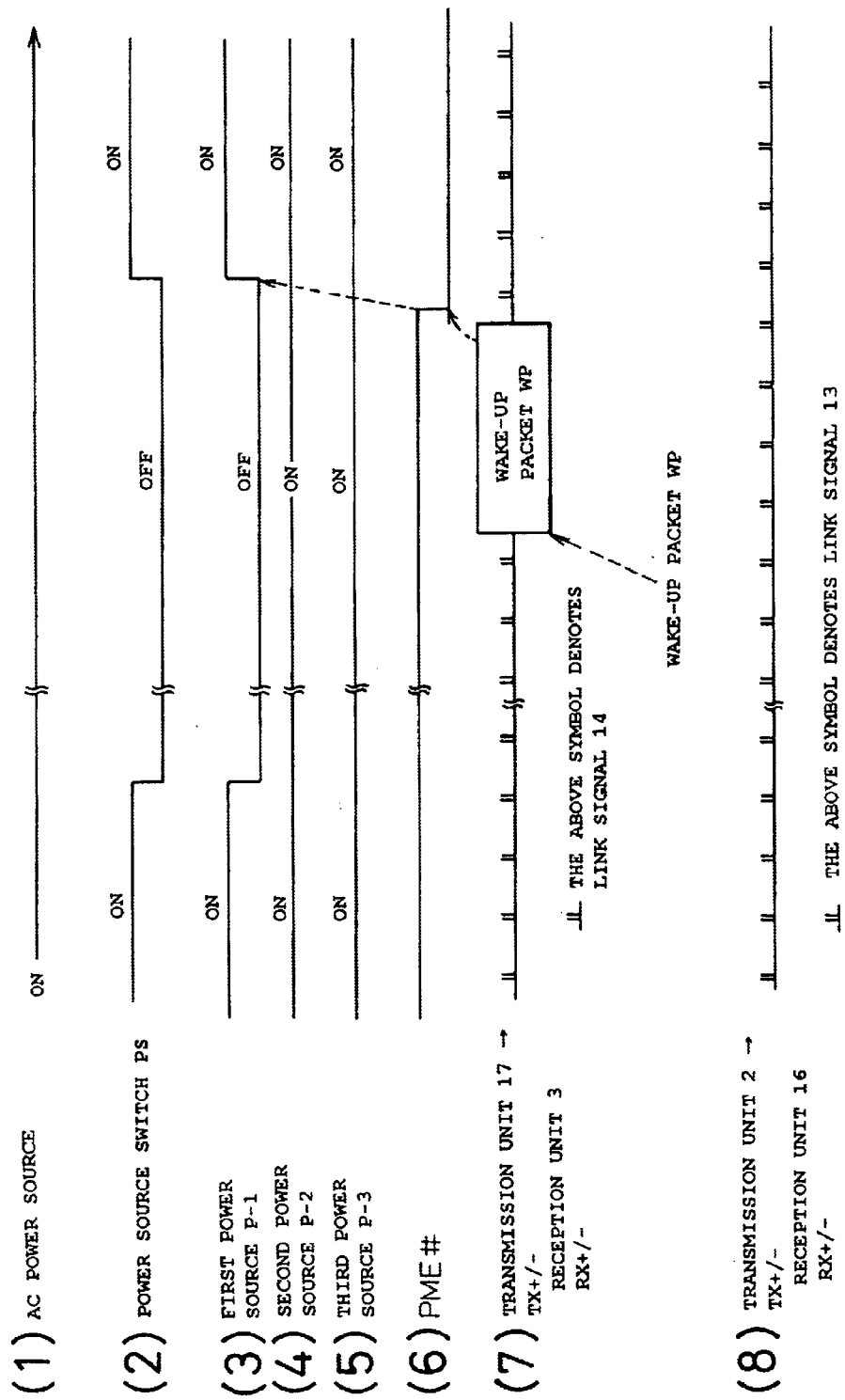
FIG. 3 is a timing chart for explaining the conventional sequence of the delivery of power sources.

As shown in FIG. 4, the client C included in the LAN control system includes, as in the conventional client (see FIG. 2), a power source circuit 6 that generates a power source for the client, a circuit portion 4 including a CPU, a memory, and a chip set, and a LAN control circuit 1 realized with a LAN chip for controlling a LAN. The power source circuit 6 receives ac power by way of an ac power source cable AP, and internally converts the ac power into dc power. The power circuit 6 then delivers a first power source P-1 to the circuit portion 4 including the CPU, and delivers a second power source P-2 to the LAN control circuit 1 through a Vcc pin terminal thereof.

Furthermore, the LAN control circuit 1 shown in FIG. 4 includes, in addition to the transmission unit 2, reception unit 3, and wake-up packet monitor unit 10 included in the conventional LAN control circuit (see FIG. 2), a power source control circuit 7 that controls the on-state and off-state levels of a power source which is to be delivered to the entire LAN control circuit 1 including the transmission unit 2 reception unit 3, and wake-up packet monitor unit 10. The power source control circuit 7 monitors the first power source P-1 and a link detection signal 11 sent from the reception unit 3 so as to control the on-state and off-state levels of a fourth power source P-4 which is to be delivered to the transmission unit 2 and those of the fifth power source P-5 which is to be delivered to the wake-up packet monitor unit 10. In other words, when the power source control circuit 7 detects that the power source switch PS of the client C is off, the power source control circuit 7 sets the fourth power source P-4 to the off-state level. This disables the transmission of the link signal 13 to the hub H. When the reception unit 3 does not produce the link detection signal 11, the power source control circuit 7 sets a fifth power source P-5 to the off-state level.

As shown in FIG. 4 and FIG. 5, the client C and hub H included in the LAN control system are, as in the conventional ones (see FIG. 2), physically interconnected over 100 Base-T or 100 Base-TX twisted-pair cables TC. Over the twisted-pair cable, a TX+/− signal produced by the transmission unit 2 included in the LAN control circuit is combined with a RX+/− signal produced by the reception unit 16 included in the transmission/reception circuit 26 in the hub. Over the other twisted-pair cable, a TX+/− signal produced by the transmission unit 17 included in the transmission/reception circuit 26 in the hub is combined with a RX+/− signal produced by the reception unit 3 included in the client.

The logical connection between the LAN control circuit 1 in the client and the hub H is attained by the establishment of a link. Over a transmission line, the link signal 13 is superposed on the TX+/− signal produced by the client. When the hub identifies the link signal 13, the hub produces a link detection signal 22. Over a reception line, when the hub receives a wake-up packet, the hub superposes a link signal 14 on the TX+/− signal produced thereby. When the client identifies the link signal 14, the client produces a link detection signal 11. When both the link detection signals 22 and 11 are produced, a link is established. The link signals 13 and 14 are produced respectively with the LAN control circuit 1 in the client activated and with the power source of the hub turned on.

As shown in FIG. 5, the hub H included in the LAN control system includes, in addition to the transmission/reception circuit 26 and power circuit 19 included in the conventional hub (see FIG. 2), a wake-up packet monitor unit 15, a power source control circuit 18, and buffer 24. The wake-up packet monitor unit 15 monitors whether or not a wake-up packet WP has been received from the server S. Based on a wake-up packet detection signal 23 produced by the wake up packet monitor unit 15, the power source control circuit 18 controls the on-state and off-state levels of the power source which is to be delivered to the transmission/reception circuit 26 that transfers various signals to or from the client C. The wake-up packet. detection signal 23 is temporarily held in the buffer 24.

The wake-up packet monitor unit 15 shown in FIG. 5 has the same features as the conventional wake-up packet monitor unit 10 (see FIG. 2) included in a client. The wake-up packet monitor unit 15 monitors whether or not a packet sent from the server is a wake-up packet. If the wake-up packet monitor unit 15 detects the wake-up packet, the wake-up packet monitor unit 15 notifies the power source control circuit 18 and buffer 24 of the fact by transferring the wake-up packet detection signal 23.

When the reception unit 16 in the transmission/reception circuit 26 detects that the client has stopped transmitting the link signal 13, the power source control circuit 18 sets sixth power source P-6 to an off-state level so an to deliver no electric power from the sixth power source to the transmission/reception circuit 26. Furthermore, the transmission unit in the transmission/reception circuit 26 does not transmit the link signal 14 which indicates the reception of the link signal 13, to the client.

Figure 6:
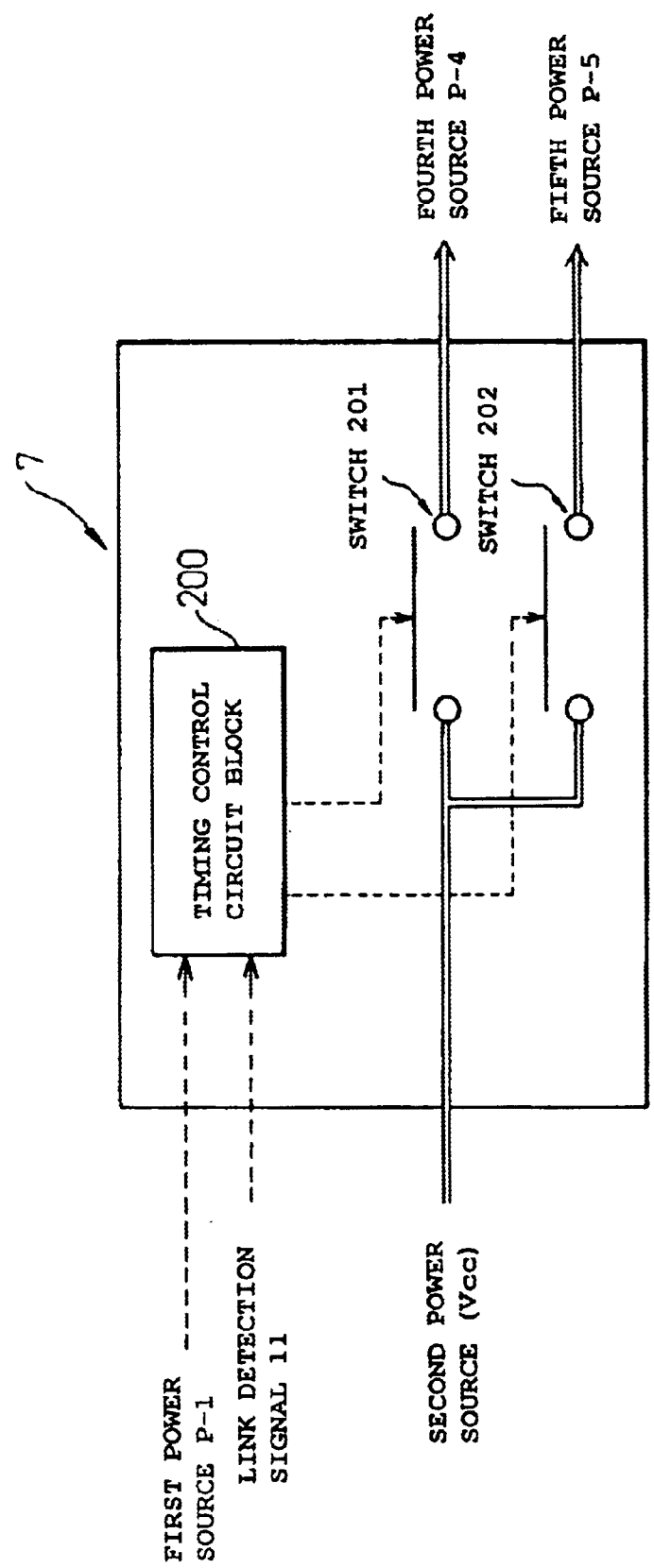
FIG. 6 is a block diagram showing the exemplary configuration of a power source control circuit shown in FIG. 4.

FIG. 6 is a block diagram showing the exemplary configuration of the power source control circuit shown in FIG. 4. As shown in FIG. 6, the client side power source control circuit 7 includes a timing control circuit block 200 that receives the first power source P-1, and two switches 201 and 202 that control whether or not the fourth power source P-4 and fifth power source P-5 should be delivered to the predetermined circuit portions of the LAN control circuit 1.

More specifically, the client side power source control circuit 7 receives the second power source P-2 (Vcc) as a source of electric power which is to be delivered as the fourth power source P-4 and fifth power source P-5. The on-state and off-state levels of the fourth power source P-4 and these of the fifth power source P-5 are controlled with the on-off operations of the switch 201 and these of the switch 202, respectively. The on-off operations of the switches 201 and 202 are controlled by the timing control circuit block 200. The timing control circuit block 200 monitors the first power source P-1 and the link detection signal 11 so as to control the on-off operations of the switch 201 and 202.

FIG. 7 is a timing chart for explaining the operations which are to be performed by the timing control circuit block shown in FIG. 6. As is obvious from the timing chart of FIG. 7, after the second power source P-2 (Vcc) is delivered to the timing control circuit block 200 (see (1) in FIG. 7) (similar to "after ac power is supplied"), the timing control circuit block 200 monitors the first power source P-1. When the first power source P-1 is set to an on-state level ((2) in FIG. 7), the switches 201 and 202 are turned on in order to deliver the fourth power source P-4 and fifth power source P-5 ((3) and (4) in FIG. 7). Thereafter, when the first power source P-1 is sat to an off-state level, the switch 201 is turned off in order to set the fourth power source P-4 to the off-state level. When the reception unit 3 in the LAN control circuit 1 has stopped receiving the link detection signal 11 (the link detection signal 11 is set to the off-state level), the fifth power source P-5 is set to the off-state level. Thereafter, when the wake-up packet WP is received, if the link detection signal 11 is re-received by the reception unit 3 in the LAN control circuit 1 (set to the on-state level), the fourth power source P-4 and fifth power source P-5 are set to the on-state level ((5) in FIG. 7).

FIG. 8 is a block diagram showing an exemplary confuguration of the power source control circuit shown in FIG. 5. As shown in FIG. 8, the hub side power source control circuit 19 includes a timing control circuit block 203 that receives the link detection signal 22 and a wake-up packet detection signal 23, and a switch 204 that controls whether or not the sixth power source P-6 should be delivered to the transmission/reception circuit 26.

More specifically, the hub side power source control circuit 18 delivers the sixth power source P-6 via the switch 204 using a third power source P-3. The on-state and off-state levels of the sixth power source P-6 are controlled with the on-off operations of the switch 204. The on-off operations of the switch 204 are controlled by the timing control circuit block 203. The timing control circuit block 203 monitors the link detection signal 22 and wake-up packet detection signal 23 so as to control the on-off operations of the switch 204.

FIG. 9 is a timing chart for explaining the operations which are to be performed by the timing control circuit block shown in FIG. 8. As is obvious from the timing chart of FIG. 9, when the reception unit 16 in the hub has stopped receiving the link detection signal 22 (the link detection signal 22 is set to an off-state level) ((1) in FIG. 9), the timing control circuit block 203 turns off the switch 204. Thus, the sixth power source P-6 is set to the off-state level ((2) in FIG. 9). Thereafter, when the wake-up packet monitor unit 15 produces the wake-up packet detection signal 23 (the wake-up packet detection signal is set to an on-state level) ((3) in FIG. 9), the switch 204 is turned on. Consequently, the sixth power source P-6 is delivered to the transmission/reception unit 26.

FIG. 10 is a block diagram showing an exemplary configuration of the buffer shown in FIG. 5. As shown in FIG. 10, the buffer 24 included in the hub includes a timing control circuit block 205 that receives the wake-up packet detection signal 23 and link detection signal 22, and a packet storage buffer 206 in which a packet sent from the server S is temporarily stored.

More specifically, the packet storage buffer 206 incorporated in the buffer 24 is controlled based on a storage signal 207 and a transmission signal 208 which are produced by the timing control circuit block 205. The timing control circuit block 205 monitors the wake-up packet detection signal 23 and link detection signal 22 so as to temporarily store the wake-up packet WP sent from the server in the packet storage buffer 206 or to transfer the wake-up packet WP to the transmission unit 17.

FIG. 11 is a timing chart for explaining the operations which are to be performed in the buffer shown in FIG. 10. AS is obvious from the timing chart of FIG. 11, the packet storage buffer 206 temporarily holds a packet sent over a transmission line linking the server and hub (usually, a packet P or a wake-up packet WP) ((1) in FIG. 11). At this time, when the wake-up packet detection signal 23 is set to an off-state level ((2) in FIG. 11). In other words, when the packet received by the hub is an ordinary packet P, the packet storage buffer 206 discards the temporarily held packet, and temporarily holds a subsequent packet ((5) in FIG. 11). When the wake-up packet detection signal 23 is set to an on-state level, the timing control circuit block 205 sets the wake-up packet detection signal 23 and a storage signal 207 to the on-state level ((3) in FIG. 11). The wake-up packet WP in the packet storage buffer 206 is not discarded but held intact. After the wake-up packet WP is held intact, as long as the link detention signal 22 assumes the off-state level, a newly received ordinary packet will not be stored. When the link detection signal 22 is set to the on-state level ((4) in FIG. 11), the wake-up packet held in the transmission unit 17 is transmitted ((6) in FIG. 11). Thereafter, the storage signal 207 is set to the off-state level so that a packet can be temporarily stored. Control is then returned to the step of temporarily storing a packet sent from the server.

Assume that a computer-readable storage medium is used to start up a personal computer realizing a client in accordance with the embodiment of the present invention. In this case, preferably, a storage medium such as a hard disk or a magneto-optical disk, on which means are stored as programs, is prepared. The stored means includes means for, when the wake-up packet WP is received from the server via the hub, turning on the power source switch PS of the client; a means for controlling the on-state and off-state levels of power sources which are to be delivered to the circuit portion 4 that includes the CPU, memory, and chip set within the client, and to the LAN control circuit 1; and a means for, when it is detected that the power source switch PS is in off-state, suppressing the transmission of the link signal 13 to the hub.

FIG. 12 and FIG. 13 are timing charts (part 1 and part 2) for explaining an overall processing sequence that involves the client and hub in accordance with the embodiment of the present invention. The processing sequence concerning the timing charts of FIG. 12 and FIG. 13 includes steps described in (A) to (G) below.

(A) Steps (1-1) and (1-2)

After an ac power plug is inserted into an ac outlet, the second power source P-2 is retained at an on-state level ((1) in FIG. 12). The client side power source control circuit 7 monitors the first power source P-1 ((2) in FIG. 12). When the first power source P-1 goes to an off-state level, the fourth power source P-4 which is to be delivered to the transmission unit 2 is set to the off-state level at step (1-1) ((3) in FIG. 12). When the fourth power source P-4 is set to the off-state level, the transmission unit 2 stops transmitting the link signal 13 to the reception unit 16 in the hub at step (1-2) ((5) in FIG. 12).

Consequently, electric power which is to be delivered to the transmission unit 2 in the client is saved. On the other hand, the transmission of the link signal 13 from the client to the hub is stopped in order to notify the hub of the fact that the power source of the client is turned off.

(D) Steps (2-1) to (2-3)

The reception unit 16 in the hub monitors the link signal 13 that is sent from the client. When the link detection signal 22 goes to an off-state level ((G) in FIG. 12), the link detection signal 22 is retained at the off state level and the power source control circuit 18 is notified the fact at step (2-1). When the power source control circuit 18 detects that the link signal 13 sent from the client has stopped, the power source control circuit 18 sets the sixth power source P-6 which is to be delivered to the reception unit 16 and transmission unit 17, to the off-state level ((10) in FIG. 13) at step (2-2). When the sixth power source P-6 to be delivered to the transmission unit 17 is set to the off-state level the transmission of the link signal 14 from the transmission unit 17 in the hub to the reception signal 3 in the client is stopped ((8) in FIG. 13) at step (2-3).

Herein, as the link signal 13 sent from the client is stopped, the hub recognizes that the power source of the client is turned off. On the other hand, the sixth power source P-6 which is to be delivered to the reception unit 16 and transmission unit 17 in the hub is set to the off-state level for the purpose of electric power saving. The hub stops transmitting the link signal 14 so as to notify the client of the fact that the hub has entered a power saving mode.

(C) Steps (3-1) and (3-2)

When the link signal 14 sent from the hub is stopped, the reception unit 3 in the client sets the link detection signal 11 to an off-state level ((9) in FIG. 13) at step (3-1). The reception unit 3 thus notifies the power source control circuit 7 of the fact that the link signal 14 has been stopped. Thereafter, the power control circuit 7 sets the fifth power source P-5 which is to be delivered to the wake-up packet monitor unit 10, to the off-state level ((4) in FIG. 12) at step (3-2).

Herein, as the link signal 14 sent from the hub is stopped, the client recognizes that the hub has entered the power saving mode. Thereafter, the client sets the fifth power source P-5 which is to be delivered to the wake-up packet monitor unit 10, to the off-state level in order to save electric power.

At this time, the power source which is to be delivered to the reception unit 3 in the client assumes an on-state level all the time. Therefore, the reception unit 3 can always monitor the link signal 14 sent from the hub, and check if the hub has changed from the power saving mode to a normal mode.

(D) Steps (4-1) to (4-5)

The wake-up packet monitor unit 15 in the hub monitors a wake-up packet sent over the transmission line between the server and hub ((12) in FIG 13). When the wake-up packet is transmitted from the server, the wake-up packet monitor unit 15 detects the fact at step (4-1). At step (4-2), the wake-up packet monitor unit 15 sets the wake-up packet detection signal 23 to an on-state level ((11) in FIG. 13), and thus notifies the power source control circuit 18 of the fact. At step (4-3), the wake-up packet is held in the buffer 24

((13) in FIG. 13). Thereafter, the power source control circuit 18 sets the sixth power source P-6 which is to be delivered to the reception unit 16 and transmission unit 17, to the on-state level ((10) in FIG. 13) at step (4-4). When the sixth power source P-6 is set to the on-state level, the transmission unit 17 retransmits the link signal 14 ((8) in FIG. 13) at step (4-5).

The hub receives the wake-up packet from the server, and sets the sixth power source P-6 which in delivered to the reception unit 16 and transmission unit 17, to the on-state level. Consequently, the hub is reset to the normal mode. Thereafter, the transmission unit 17 transmits the link signal 14 so as to notify the client of the fact that the client should change from the power saving mode to the normal mode.

(E) Steps (5-1) and (5-2)

On receipt of the link signal 14, the reception unit 3 in the client sets the link detection signal 11 to an on-state level ((9) in FIG. 13) at Step (5-1). The reception unit 3 thus notifies the power source control circuit 7 of the fact that the reception unit 3 has received the link signal 14. When the link signal 14 is transmitted, the power source control circuit 7 sets the fourth power source P-4 and fifth power source P-5 to the on-state level at step (5-2). Consequently, the transmission unit 2 and wake-up packet monitor unit 10 are reactivated ((3) and (4) in FIG. 12).

In other words, when the client detects the link signal 14 sent from the hub, the client sets the fourth power source P-4 and fifth power source P-5 to the on-state level. Consequently, the client is reset from the power saving mode to the normal mode.

(F) Step (6-1)

When the fourth power switch P-4 is delivered to the transmission unit 2 in the clients, the transmission unit 2 retransmits the link signal 13 ((5) in FIG. 12) at step (5-2). Specifically, the client transmits the link signal 13 from the transmission unit 2, and thus notifies the hub of the fact that the client has been reset to the normal mode.

(G) Steps (7-1) to (7-5)

When the reception unit 16 in the hub detects the link signal 13 sent from the client, the reception unit 16 sets the link detection signal 22 to an on-state level ((6) in FIG. 12) at step (7-1). When the link detection signal 22 is set to the on-state level, the buffer 24 transmits the held wake-up packet to the transmission unit 17 ((8) in FIG. 13) at step (7-3).

In the client, the reception unit 3 receives the wake up packet. The wake-up packet monitor unit 10 identifies the wake-up packet, and sets the wake-up signal 12, that is, a PME# signal to the on-state level ((7) in FIG. 13) at step (7-4). When the PME# signal is set to the on state level, the power source circuit 6 sets the first power source P-1 to the on-state level. The power source of the client is thus turned on, and the client becomes usable ((2) in FIG. 12).

Specifically, the hub detects the link signal 13 sent from the client, and recognizes that the client has been reset to the normal state. The hub then transmits the wake-up packet so as to turn on the power source of the client.

As described so far, according to the constituent features of the typical preferred embodiments of the present invention, when the power sources of a client and a hub are in off-state, for example, when the hub stands by for a wake-up packet sent from the server, power sources which are to be delivered to circuit included in the client and hub are controlled in order to achieve electric power saving.

What is claimed is:

1. A network control system which includes a managing device, separate devices that communicate with said managing device, and a repeater that interconnects said managing device and said separate devices, and in which when a power source switch on a separate device having received an activating signal from said managing device via said repeater is turned on, said managing device performs various kinds of maintenance on the separate device, said network control system comprising:

a power source control circuit, included in each separate device, for controlling the on-state and off-state levels of a power source that is to be delivered to a circuit including at least a separate device side activating signal monitor unit which monitors whether or not an activating signal has been received, wherein when said power source control circuit detects that said power source switch is in off-state, said power source control circuit suppresses the transmission of a predetermined signal to said repeater.

2. A network control system according to claim 1 wherein, when said repeater detects that a separate device has stopped transmitting the predetermined signal, said repeater stops transmitting a signal which indicates the reception of the predetermined signal, to the separate device.

3. A network control system according to claim 1 wherein, when a separate device detects that said repeater has stopped transmitting a signal which indicates the reception of the predetermined signal, the separate device sets a power source which is to be delivered to said separate device side activating signal monitor unit, to the off-state level.

4. A network apparatus which has a power source switch thereof turned on when receiving an activating signal sent from a managing device via a repeater over a network, and on which said managing device performs various kinds of maintenance, said device comprising:

a power source control circuit for controlling the on-state and off-state levels of a power source which is to be delivered to a circuit including at least an activating signal monitor unit which monitors whether or not the activating signal has been received, wherein:

when said power source control circuit detects that said power source switch is in off-state, said power control circuit suppresses the transmission of a predetermined signal to said repeater.

5. A network apparatus according to claim 4 wherein, when the predetermined signal is not transmitted to said repeater any longer, if said power source control circuit detects that said repeater has stopped transmitting a signal which indicates the reception of the predetermined signal, said power source control circuit sets a power source which is to be delivered to said activating signal monitor unit, to the off-state level.

6. A network apparatus according to claim 4 wherein, when said repeater notifies that said repeater has detected the reception of the activating signal from said managing device, said power source control circuit sets the power source which is to be delivered to said circuit, including at least said activating signal monitor unit, to the on-state level.

7. A network apparatus according to claim 5 wherein, when said repeater notifies that said repeater has detected the reception of the activating signal sent from said managing device, said power source control circuit sets the power source which is to be delivered to said circuit, including at least said activating signal monitor unit, to the on-state level.

8. A network apparatus according to claim 6 wherein, after the power which is to be delivered to said circuit, including at least said activating signal monitor unit, is set to the on-state level, the predetermined signal is retransmitted to said repeater.

9. A network apparatus according to claim 7 wherein, after the power source which is to be delivered to said circuit, including at least said activating signal monitor unit, is set to the on-state level, the predetermined signal is retransmitted to said repeater.

10. A repeater that, when a managing device and separate devices which communicate with said managing device are interconnected over a network, if an activating signal is received from said managing device, allows said managing device to perform various kinds of maintenance on each of said separate devices, said repeater comprising:

an activating signal monitor unit for monitoring whether or not the activating signal has been received; and a power source control circuit for controlling the on-state and off-state levels of a power source which is to be delivered to a transmission/reception circuit that transfers various kinds of signals to or from each of said separate devices, according to a signal sent from said activating signal monitor unit, wherein when said transmission/reception circuit detects that a given separate device has stopped transmitting a predetermined signal, said power source control circuit sets the power source which is to be delivered to said transmission/reception circuit, to the off-state level, and said transmission/reception circuit stops transmitting a signal which indicates reception of the predetermined signal, to the given separate device.

11. A repeater according to claim 10 wherein, when said activating signal monitor unit detects that the activating signal has been received, said power source control circuit sets the power source which is delivered to said transmission/reception circuit, to the on-state level, and said transmission/reception circuit transmits a signal which indicates reception of the activating signal, to the given separate device.

12. A repeater according to claim 11 wherein, after said transmission/reception circuit transmits the signal which indicates reception of the activating signal, to a separate device, when said transmission/reception circuit detects that the predetermined signal is retransmitted from the given separate device, said transmission/reception circuit retransmits the signal which indicates reception of the predetermined signal, to the given separate device.

13. A connecting apparatus for connecting a network apparatus, which has a power source switch thereof turned on when receiving an activating signal sent from a managing device via a repeater over a network and on which said managing device performs various kinds of maintenance, onto said network, said connecting apparatus comprising:

a power source control circuit for controlling the on-state and off-state levels of a power source which is to be delivered to a circuit including at least an activating signal monitor unit that monitors whether or not the activating signal has been received, wherein:

when said power source control circuit detects that said power source is in off-state, said power source control circuit suppresses the transmission of a predetermined signal to said repeater.

14. A connecting apparatus according to claim 13 wherein, when the predetermined signal is not transmitted to said repeater any longer, if said power source control circuit detects that said repeater has stopped transmitting a signal which indicates the reception of the predetermined signal, said power source control circuit sets the power source which is to be delivered to said activating signal monitor unit, to the off-state level.

15. A Connecting apparatus according to claim 13 wherein, when said repeater notifies that said repeater has detected the reception of the activating signal from said managing device, said power source control circuit sets the power source which is to be delivered to said circuit, including at least said activating signal monitor unit, to the on-state level.

16. A connecting apparatus according to claim 14 wherein, when said repeater notifies that said repeater has detected the reception of the activating signal from said managing device, said power source control circuit sets the power source which is to be delivered to said circuit, including at least said activating signal monitor unit, to the on-state level.

17. A connecting apparatus according to claim 15 wherein, after the power source which is to be delivered to said circuit, including at least said activating signal monitor unit, is set to the on-state level, the predetermined signal is retransmitted to said repeater.

18. A connecting apparatus according to claim 16 wherein, after the power source which is to be delivered to said circuit, including at least said activating signal monitor unit, is set to the on-state level, the predetermined signal is retransmitted to said repeater.

* * * * *